(12) United States Patent
Min (10) Patent No.: US 10,448,097 B2
(45) Date of Patent: Oct. 15, 2019

(54) AUDIENCE RATING SURVEY APPARATUS AND AUDIENCE RATING SURVEY SYSTEM USING THE SAME

(71) Applicant: TNMS CO., LTD., Seoul (KR)

(72) Inventor: Gyung Sook Min, Seoul (KR)

(73) Assignee: TNMS CO., LTD., Seoul (KR)

( * ) Notice: Subject to any disclaimer, the term of this patent is extended or adjusted under 35 U.S.C. 154(b) by 105 days.

(21) Appl. No.: 15/224,310

(22) Filed: Jul. 29, 2016

(65) Prior Publication Data

US 2017/0332138 A1    Nov. 16, 2017

(30) Foreign Application Priority Data

May 13, 2016   (KR) .......................... 10-2016-058817

(51) Int. Cl.

| | | |
|---|---|---|
| *H04N 21/442* | (2011.01) | |
| *H04N 21/443* | (2011.01) | |
| *H04N 21/643* | (2011.01) | |
| *H04N 21/258* | (2011.01) | |
| *H04N 21/25* | (2011.01) | |
| *H04N 21/24* | (2011.01) | |
| *H04N 21/475* | (2011.01) | |

(52) U.S. Cl.
CPC ... *H04N 21/44213* (2013.01); *H04N 21/4432* (2013.01); *H04N 21/44222* (2013.01); *H04N 21/64322* (2013.01); *H04N 21/24* (2013.01); *H04N 21/2407* (2013.01); *H04N 21/25* (2013.01); *H04N 21/251* (2013.01); *H04N 21/258* (2013.01); *H04N 21/25883* (2013.01); *H04N 21/25891* (2013.01); *H04N 21/4758* (2013.01)

(58) Field of Classification Search
None
See application file for complete search history.

(56) References Cited

U.S. PATENT DOCUMENTS

| | | | |
|---|---|---|---|
| 2002/0138830 A1 | 9/2002 | Nagaoka et al. | |
| 2007/0252920 A1* | 11/2007 | Chen ........................ | H04N 5/63 348/839 |

(Continued)

FOREIGN PATENT DOCUMENTS

| | | |
|---|---|---|
| KR | 1020020035615 | 5/2002 |
| KR | 20050026920 | 3/2005 |

(Continued)

*Primary Examiner* — Justin E Shepard
(74) *Attorney, Agent, or Firm* — Kilpatrick Townsend & Stockton LLP (57) ABSTRACT

A display device for audience rating survey is provided. The display device for audience rating survey includes: a power supply unit configured to be synchronized with a power supply unit of a surveying target equipment; a receiving unit configured to receive a signal for a viewing entity; a light emitting unit comprising a plurality of light emitting elements configured to emit light according to the signal received; a storage unit configured to match the signal received and each of the plurality of light emitting elements and store the matched result; a control unit configured to allow a matched light emitting element to emit light according to the received signal; and a transmitting unit configured to transmit information for the light emitting element, which is emitting the light, to an external device.

10 Claims, 10 Drawing Sheets

(56) References Cited

U.S. PATENT DOCUMENTS

| | | | | |
|---|---|---|---|---|
| 2008/0244675 | A1* | 10/2008 | Sako | H04H 60/48 |
| | | | | 725/114 |
| 2013/0204825 | A1* | 8/2013 | Su | G06N 5/04 |
| | | | | 706/46 |
| 2014/0047467 | A1* | 2/2014 | Arling | H04N 21/42204 |
| | | | | 725/14 |
| 2017/0285594 | A1* | 10/2017 | Stewart | G05B 19/042 |

FOREIGN PATENT DOCUMENTS

| | | |
|---|---|---|
| KR | 1020100000464 | 1/2010 |
| KR | 1020100116306 | 11/2010 |
| KR | 20150034323 | 4/2015 |

* cited by examiner

AUDIENCE RATING SURVEY APPARATUS AND AUDIENCE RATING SURVEY SYSTEM USING THE SAME

CROSS-REFERENCE TO RELATED APPLICATION(S)

This application claims the benefit under 35 U.S.C. § 119(a) of Korean Patent Application No. 10-2016-0058817, filed on May 13, 2016 in the Korean Intellectual Property Office, the entire disclosure of which is hereby incorporated by reference.

TECHNICAL FIELD

The present disclosure relates to a technique for surveying TV audience ratings, and more particularly, to an audience rating survey apparatus capable of more accurately surveying audience ratings in real time in an internet environment and an audience rating survey system using the same.

BACKGROUND

Among audience rating survey methods used in terrestrial broadcasting, cable broadcasting, and satellite broadcasting, there are diary type surveys in which questionnaires are distributed and people are requested to fill in the questionnaires, interview surveys by interviewers visiting or calling interviewees, meter surveys in which machines automatically record the ratings, and surveys using people meters.

The diary type survey is to release printed booklets to viewers and ask the viewers to write records of their exposures to media, which is advantageous in that it is cheapest than any other survey methods but has limitations in depending on memories of the viewers. For example, in a case where viewers remember wrong channel numbers or confuse programs and channels, reliability of audience rating survey becomes degraded. In addition, it is also disadvantageous in taking relatively more time to collect and process data.

The interview survey is to survey audience ratings through visiting or phone interviews. Compared to the diary type survey in which audience rating records are written by the viewers themselves, the interview survey has merits in being able to collect more reliable data. However, such a method has limitations such as human memory limitations, non-cooperation by interviewees, or more survey costs.

The survey method using the people meter is performed with a certain number of households selected according to a sampling method called as panel like a meter survey method. A device called as people meter is installed in the TV in each household, and a remote controller-type mechanical device is checked by a user's intervention. The people meter method is currently the most widely used audience rating survey method around the world.

However, since the audience rating survey method using the people meter is performed by installing the people meter devices in the sampled panelist households and with cooperation by users, the method has inaccuracy due to the limited number of the sampling to panelist households and is not possibly performed in real-time. In addition, although the people meter method is somewhat accurate compared to other methods, installation of the people meter devices is complicated and costly, and the method essentially requires continuous and devoted cooperation by panelists. Furthermore, the resultant audience ratings vary greatly according to the number of panelist distributions and survey methods thereof.

On the other hand, as the broadcasting techniques have been recently developed, cable TV or Internet Protocol TV (IPTV) broadcasting are being actively developed in addition to the traditional terrestrial broadcasting, satellite broadcasting or the like. In particular, the IPTV is to provide multimedia services such as TV, video, audio, document, graphic and data services through an IP network in which quality, security, and reliability are ensured, and is a broadcasting field in which explosive growth is expected in the future.

In such a new environment, a new audience rating survey apparatus and system are necessary which performs an audience rating survey more accurately and conveniently.

SUMMARY

An aspect of the present disclosure is to provide an apparatus and system capable of surveying audience ratings in real-time with a simpler device.

In accordance with an aspect of the present disclosure, a display device for audience rating survey is provided. The display device includes: a power supply unit configured to be synchronized with a power supply unit of a surveying target equipment; a receiving unit configured to receive a signal for a viewing entity; a light emitting unit comprising a plurality of light emitting elements configured to emit light according to the signal received; a storage unit configured to match the signal received and each of the plurality of light emitting elements and store the matched result; a control unit configured to allow a matched light emitting element to emit light according to the signal received; and a transmitting unit configured to transmit information for the light emitting element, which is emitting the light, to an external device.

In accordance with another aspect of the present disclosure, an audience rating survey apparatus is provided. The audience rating survey apparatus includes: a receiving unit configured to receive a signal for a viewing entity of a surveying target equipment; a channel data collecting unit configured to determine a channel by collecting data for viewing channel; a storage unit configured to store signal information for the viewing entity in association with the data for viewing channel; a transmitting unit configured to transmit the signal information in association with data for viewing channel stored in the storage; and a control unit configured to control the receiving unit, the channel data collecting unit, the storage unit, and the transmitting unit.

In accordance with still another aspect of the present disclosure, an audience rating survey system is provided. The audience rating survey system includes: a display device for audience rating survey having a power unit synchronized with a power unit of a surveying target equipment and configured to allow a specific light emitting element to emit light according to a signal for a viewing entity by receiving the signal; an audience rating survey apparatus configured to receive the signal for viewing entity from the display device for audience rating survey and transmit, to an audience rating survey server, the signal for viewing entity; and the audience survey server configured to analyze an audience rating by receiving the signal for viewing entity from the audience rating survey apparatus.

DETAILED DESCRIPTION

Hereinafter, specific embodiments will be described in detail with reference to the accompanying drawings. In the present document, same reference numerals on drawings are used to designate same or similar elements throughout the drawings and repeated descriptions of the same components will be omitted.

Specific structural and functional descriptions on the exemplary embodiments of the present disclosure that are disclosed in this document are merely exemplary descriptions that are provided in order to describe the exemplary embodiments of the present disclosure, and, therefore, the exemplary embodiments of the present disclosure may be practiced in diverse formats and should not be construed as being limited to those described in this document.

An expression of "first" or "second" used in various embodiments in the present disclosure may modify various components regardless of the order and/or the importance but does not limit the corresponding components. For example, a first element could be termed a second element, and, similarly, a second element could be termed a first element, without departing from the scope of example embodiments.

Terms used in the present disclosure are not intended to limit the scope of another embodiment of the present disclosure but to illustrate a specific example embodiment. As used herein, the singular forms "a," "an" and "the" are intended to include the plural forms as well, unless the context clearly indicates otherwise.

Unless differently defined, entire terms including a technical term and a scientific term used here have the same meaning as a meaning that may be generally understood by persons of skilled in the art. It should be analyzed that generally using terms defined in a dictionary have a meaning corresponding to that of a context of related technology and are not analyzed as an ideal or excessively formal meaning unless explicitly defined. In some cases, even the term defined in the present disclosure should not be interpreted to exclude embodiments of the present disclosure.

Figure 1A:
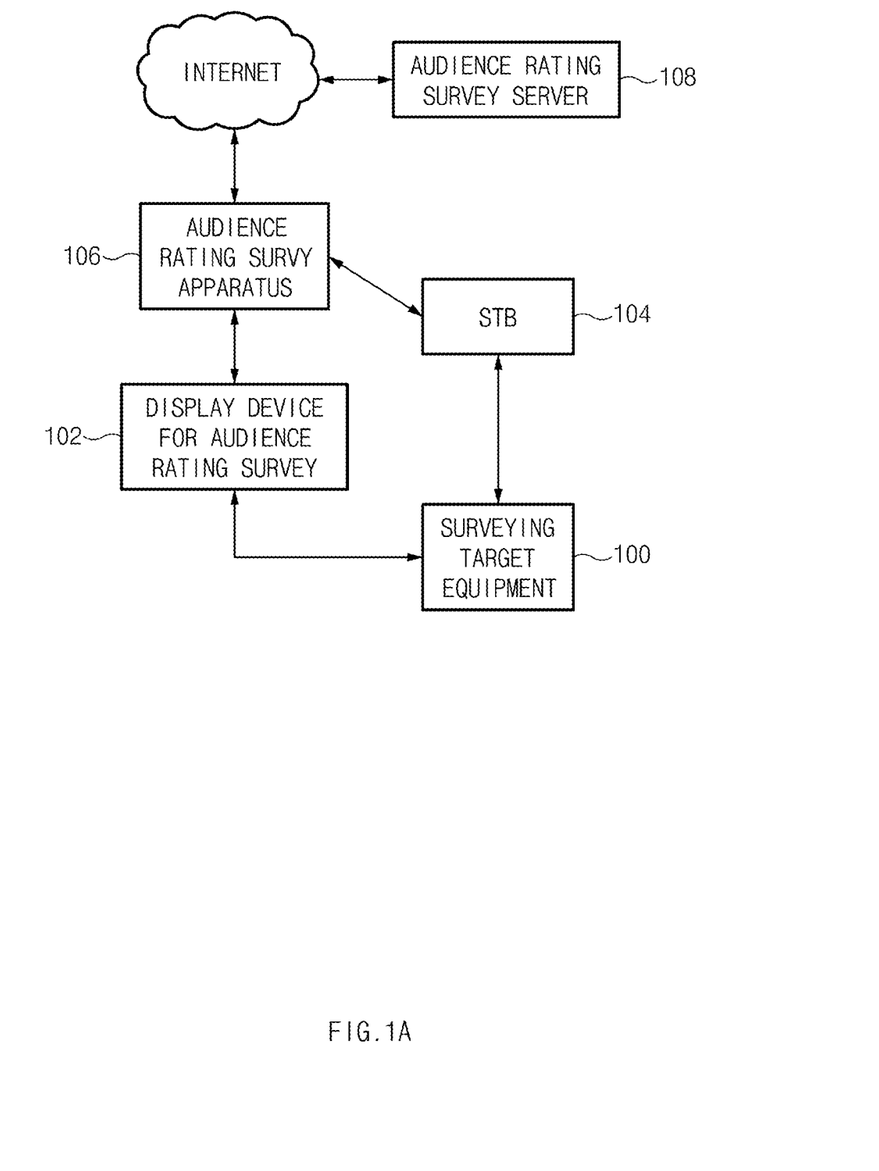
FIGS. 1A and 1B illustrate overall configurations of an audience rating survey system.
Figure 1B:
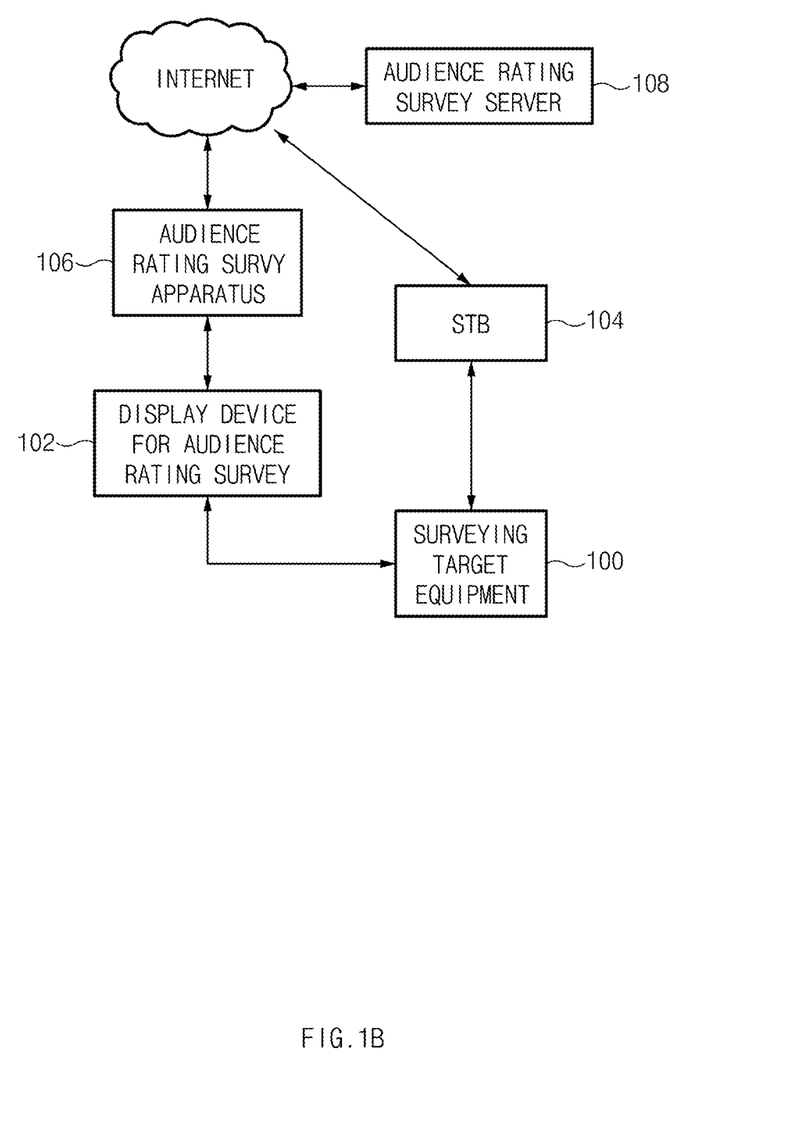

FIGS. 1A and 1B illustrate overall configurations of an audience rating survey system. A surveying target equipment 100 may be a typical device for displaying broadcasting information. For example, the surveying target equipment 100 may be a TV through which people may view broadcasting at home.

A display device for audience rating survey 102 detects ON/OFF state of the surveying target equipment 100 and receives a signal for a viewing entity of the surveying target equipment 100 in real time from a remote controller to turn on a light emitting element of a number allocated to the corresponding viewing entity in a light emitting unit. In detail, for example, the display device for audience rating survey 102 is realized in a structure that is to connected to a USB port of the surveying target equipment 100 such that power is supplied from the surveying target equipment 100. In other words, the power is supplied only when the surveying target equipment 100 is in ON state, so that the display device for audience rating survey 102 becomes ON state. Accordingly, it may be checked that the surveying target equipment 100 is in ON state by checking that the display device for audience rating survey 102 is in ON state.

In order to check ON/OFF state of the surveying target equipment 100, for example, a method is typically used which detects ON/OFF state of a surveying target equipment by providing a separate power detecting unit, installing a current amount measuring device so as to enclose, in a ring type, a power supplying cable of the surveying target equipment, converting an induction current, which is generated in the current amount measuring device by a magnetic field formed around the power cable, into a voltage value, and then measuring the magnitude of the voltage to determine whether a current flows through the power cable. However, in such a method, it is burdensome to install separate equipment such as the current amount measuring device. Since receiving power from the surveying target equipment 100, the display device for audience rating survey 102 does not require a separate equipment for detecting ON/OFF state of the surveying target equipment 100 and may detect ON/OFF state of the surveying target equipment 100 by detecting ON/OFF state of itself.

In addition, the display device for audience rating survey 102 includes a light emitting unit which includes a plurality of light emitting elements. Each of the plurality of light emitting elements is allocated with a specific number for each viewing entity of the surveying target equipment. Such information for viewing entity is a unique number given to each member of an audience rating survey target household and the audience rating survey for each viewer is enabled by each viewer inputting to add his/her own number when starting to view the surveying target equipment 100 for each viewer (i.e. each member) and by removing his/her own number at time of ending the viewing. In other words, if the display device for audience rating survey 102 receives a signal for a specific viewing entity, a light emitting element of a number allocated to a corresponding viewing entity emits light from among the plurality of light emitting elements.

In addition, the display device for audience rating survey 102 periodically receives a request for transmitting viewing entity information from an audience rating survey apparatus 106. At this point, in a case where turned on by receiving power according to turn-on of the surveying target equipment 100, the display device for audience rating survey 102 transmits the viewing entity information, which has been received in response to the request for transmitting the viewing entity information, to the audience rating survey apparatus 106. The audience rating survey apparatus 106 may receive information for the ON state of the surveying target equipment and information for viewing entity by receiving the viewing entity information from the display device for audience rating survey 102. In the present embodiment, it is described that the number is given as the information for the viewing entity, but the present disclosure is not limited thereto. For example, anything capable of identifying the viewing entity such as alphabets including a, b, and c, or characters, or symbols is allowed.

The audience rating surveying apparatus 106 is connected between the internet network (IP network) and a set-top box (STB) to monitor IP packets transmitted from the STB to the IP network, collects viewing channel data for real time IP broadcasting and IP-VoD broadcasting programs for the surveying target equipment connected to the STB, and transmits the collected viewing channel data to an audience rating survey server 108. However, in a case where the surveying target equipment is not for an IPTV but for a cable TV or a public channel TV, as illustrated in FIG. 1B, the audience rating survey apparatus 106 may not exchange data with the STB but may collect channel data using voice data output from the surveying target equipment. At this point, the audience rating surveying apparatus 106 transmits the viewing channel data to the audience rating survey server 108 periodically at each pre-designated time or in a case where receiving a data transmission command from the audience rating survey server 108.

In addition, the audience rating survey apparatus 106 may monitor the power ON/OFF state of the surveying target equipment 100 through the display device for audience rating survey 102 (by receiving the information for viewing entity from the display device for audience rating survey 102, since the display device for audience rating survey 102 is driven only when the surveying target equipment 100 is in ON state) and may collect the viewing channel data only in a case where the surveying target equipment 100 is in ON state. In addition, the audience rating survey apparatus 106 performs data communication with the audience rating surveying server 108 to allow a user to remotely check, through the audience rating surveying server 108, function setting for the audience rating survey apparatus 106, set data inquiry, item setting in relation to audience rating data collection, and information inquiry for the collected audience rating data or the like. In addition, the audience rating survey apparatus 106 requests that the display device for audience rating survey 102 transmits information for viewing entity at every pre-designated time or in a case where a data transmission command is received from the audience rating survey server 108. Accordingly, in a case where the display device for audience rating survey 102 becomes ON state due to ON state of the surveying target equipment 100, the received information for viewing entity is transmitted to the audience rating surveying apparatus 106.

If receiving the information for the viewing entity from the display device for audience rating survey 102, the audience rating surveying apparatus 106 becomes to know that the surveying target equipment 100 is in ON state, stores data for a corresponding viewing entity, and transmits the data for the corresponding viewing entity together when transmitting the collected viewing channel data to the audience rating survey server 108. In addition, although illustrated as a separate apparatus from the STB 104, the audience rating survey apparatus 106 and the STB 104 may be configured to be integrated.

The audience rating survey server 108 receives audience rating data including the viewing channel data and viewing entity information from the audience rating survey apparatus 106 to manage the viewing channel data, processes the audience rating data to calculate various statistical results such as an audience rating for each category (TV, channel, broadcasting method, broadcasting program, date), and allows a manager to make inquiries about the calculated results. In addition, the audience rating survey server 108 allows the manager or the viewer to make an access thereto through a web page and to remotely perform function setting for the audience rating survey apparatus 106, set data inquiry, item setting in relation to audience rating data collection, and information inquiry for the collected audience rating data by providing an interface screen (i.e. a web page) through which the audience rating survey apparatus 106 may be remotely managed and controlled. At this point, authorities for information inquiry and function control may be differentiated between the manager and the viewer.

Figure 2:
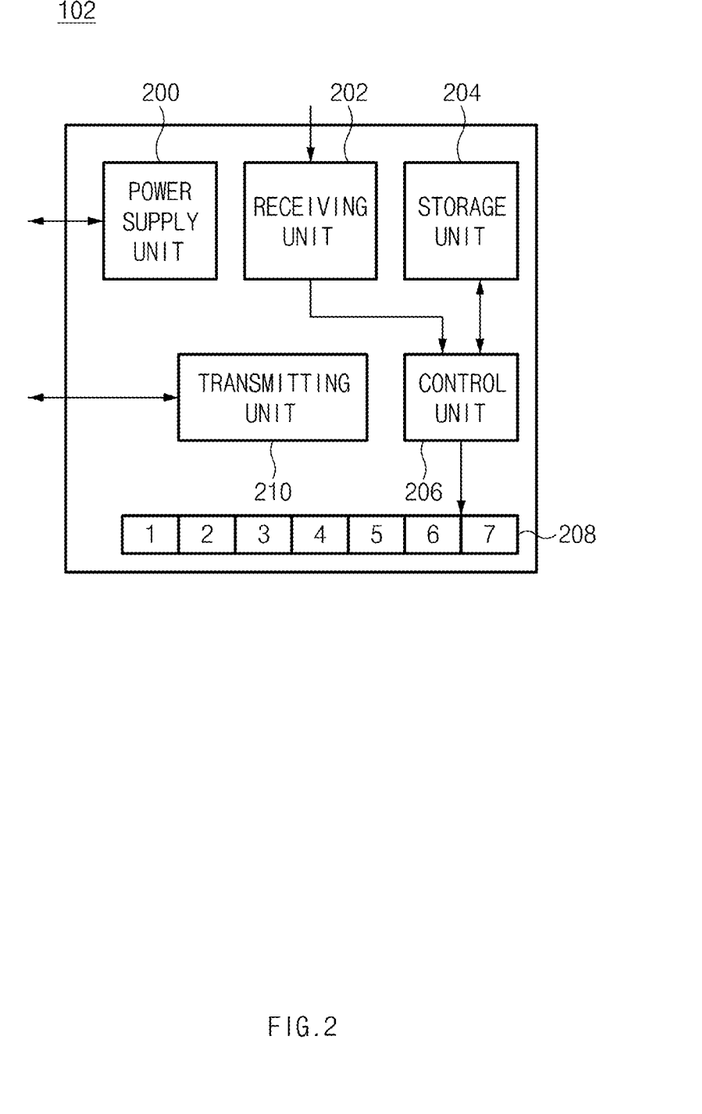
FIG. 2 is a configuration diagram illustrating in detail a configuration of the display device for audience rating survey 102 of FIG. 1.

FIG. 2 is a configuration diagram illustrating in detail a configuration of the display device 102 for audience rating survey of FIG. 1.

The display device for audience rating survey 102 includes a power supply unit 200, a receiving unit 202, a storage unit 204, a control unit 206, a light emitting unit 208, and a transmitting unit 210.

The power supply unit 200 of the display device for audience rating survey 102 is synchronized with a power supply unit of the surveying target equipment 100. In detail, the display device for audience rating survey 102 is connected to the surveying target equipment 100 to receive power through, for example, a USB connector. In other words, since the display device for audience rating survey 102 connects the USB connector to a USB port formed in the surveying target equipment 100 to receive, without a separate own power supply, power from the surveying target equipment 100 only when the surveying target equipment 100 is in ON state, the power supply unit 200 of the display device for audience rating survey 102 becomes synchronized with the power supply unit of the surveying target equipment 100. Accordingly, the display device for audience rating survey 102 becomes ON when the surveying target equipment 100 is in ON state, and becomes OFF when the surveying target equipment 100 is in OFF state. Only when the display device for audience rating survey 102 is in ON state, a request for transmitting data for viewing entity is received from the audience rating survey apparatus 106 and data therefor is transmitted.

The receiving unit 202 of the display device for audience rating survey 102 receives a signal for viewing entity information from an external device. The signal for viewing entity is determined in advance and each viewing entity is allocated to each specific signal. Accordingly, data for the viewing entity may be collected according to the signal for viewing entity received from the receiving unit 202, and a light emitting element corresponding to the corresponding viewing entity may emit light. In addition, the receiving unit 202 of the display device for audience rating survey 102 periodically receives a request for transmitting the viewing entity information from the audience rating survey apparatus 106. Such a request is received only when the display device for audience rating survey is in ON state.

The storage unit 204 of the display device for audience rating survey 102 stores data (e.g. an OS, operation programs, and setting information) necessary for operation of the display device for audience rating survey 102. In addition, the storage unit 204 of the display device for audience rating survey 102 stores a number matched with a light emitting element among the plurality of light emitting elements and a corresponding viewing entity. Accordingly, if the receiving unit 202 receives the viewing entity information from the external device (e.g. a remote controller or the like), a corresponding light emitting element emits light according to a light emitting element number that is stored in the storage unit 204 and corresponds to the received viewing entity information. For example, in a case where the storage unit 204 stores information such that a case where a viewing entity is the mom among household members is number 1, a case of the dad is number 2, a case of the son is number 3, and a case of the daughter is number 4, and the daughter views the surveying target equipment, viewing entity information corresponding to number 4 is transmitted to the display device for audience rating survey 102 using an external device and the display device for audience rating survey 102, which receives the viewing entity information corresponding to the number 4, makes a light emitting element 208 corresponding to number 4 emit light. Accordingly who is the viewing entity may be visually checked.

The control unit 206 of the display device for audience rating survey 102 controls the receiving unit 202, the storage unit 204, the light emitting unit 208, and the transmitting unit 210. In detail, if the receiving unit 202 receives a signal for viewing entity from the external device, the control unit 206 makes the light emitting element 208 of a number matched with the received signal for viewing entity emit light. In addition, the control unit of the display device for audience rating survey 102 transmits, to the audience rating survey apparatus 106, information for the viewing entity in response to reception of the audience rating transmission request from the audience rating survey apparatus 106.

The light emitting unit 208 of the display device for audience rating survey 102 is formed of a plurality of light emitting elements, and each of the plurality of light emitting elements is set to a number matched with the viewing entity. In addition, if a signal for viewing entity matched with each light emitting element is received from the external device, a light emitting element of a number matched with the corresponding viewing entity emits light. For example, if, in a household in which the audience rating survey apparatus is installed, number 1 is pre-stored for the mom and the mom transmits a signal for viewing entity corresponding to number 1 to the display device for audience rating survey 102 through an external device, a light emitting element corresponding to number 1 in the light emitting unit 208 of the display device for audience rating survey 102 emits light.

The transmitting unit 210 of the display device for audience rating survey 102 transmits, in real time, information for viewing entity periodically at a pre-determined time interval or when receiving a request for transmitting the information for viewing entity from the audience rating survey apparatus 106. For example, as described above, in a case where the mom, who has been allocated to number 1, is viewing the surveying target equipment and receives a signal allocated to number 1 from an external device, a light element matched with number 1 emits light and information for viewing entity, namely, information corresponding to number 1 is transmitted at the above-described time (i.e. at the pre-determined period or in a case where receiving the request for transmitting the information for viewing entity from the audience rating survey apparatus 106).

Figure 3:
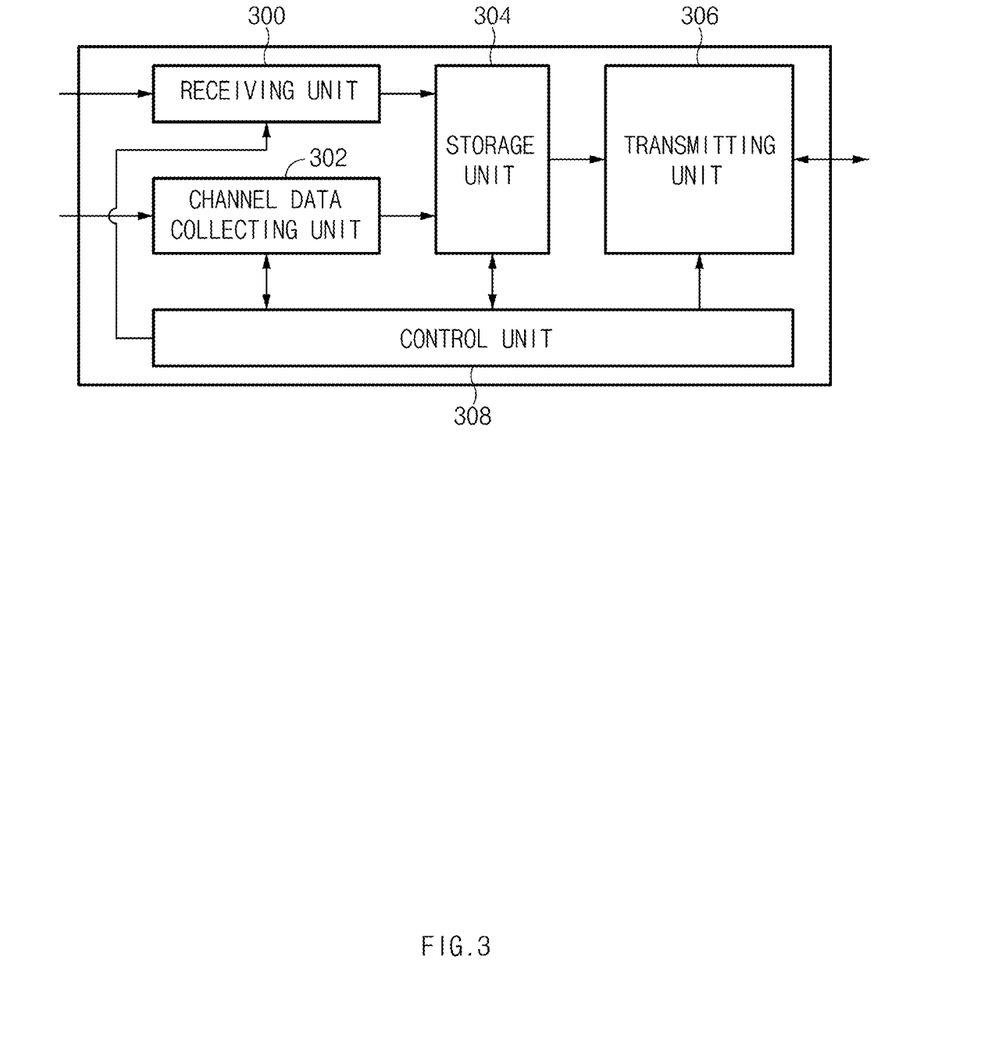
FIG. 3 is a configuration diagram illustrating in detail a configuration of the audience rating survey apparatus 106 of FIG. 1.

FIG. 3 is a configuration diagram illustrating in detail a configuration of the audience rating survey apparatus 106 of FIG. 1.

The audience rating survey apparatus 106 includes a receiving unit 300, a channel data collecting unit 302, a storage unit 304, a transmitting unit 306, and a control unit 308.

The receiving unit 300 of the audience rating survey apparatus 106 receives a data transmission command from the audience rating survey server 108. However, in a case where transmitting the information for viewing entity and the viewing channel data, in a case where the audience rating survey apparatus 106 is set to transmit the information for viewing entity and the viewing channel data at a pre-determined constant time interval without a separate data transmission command from the audience rating survey server 108, the receiving unit 300 of the audience rating survey apparatus 106 does not receive the data transmission command from the audience rating survey server 108.

In addition, the receiving unit 300 of the audience rating survey apparatus 106 receives, as data, the information for viewing entity from the display device for audience rating survey 102. In a case where the receiving unit 300 of the audience rating survey apparatus 106 receives the information for viewing entity from the display device for audience rating survey 102, since the display device for audience rating survey 102 should be in ON state, it may be seen that the display device for audience rating survey 102 is in ON state by receiving the information for viewing entity from the display device for audience rating survey 102, and if the display device for audience rating survey 102 is in ON state, it may be seen that the surveying target equipment 100, which is synchronized with the power supply unit 200 of the display device for audience rating survey 102, is in ON state. In addition, a time when the audience rating survey apparatus 106 receives the information for viewing entity from the display device for audience rating survey 102 may be set to a pre-determined time interval (in a case where the display device for audience rating survey 102 is in ON state) or when there is a request for information for viewing entity from the audience rating survey apparatus 106.

The channel data collecting unit 302 collects channel data delivered from the STB to the internet network. In detail, if a viewer changes a channel of the surveying target equipment 100 or selects a broadcast program in the IP-VoD, the selection information is delivered to an internet broadcasting server through the internet network. Accordingly, the channel data collecting unit 302 mirrors packets to be delivered from the STB to the internet network and then extracts ICMP packets, which include TV channel changing information or HTTP packets including IP-VoD broadcast program selection information, from among the mirrored packets to capture the extracted packets, and then collects channel data by analyzing the captured packets.

In addition, for example, that a viewer starts to view a specific broadcast channel in IPTV broadcasting means Internet Group Management Protocol (IGMP)-joining to an IP network with a specific group address and a group address pair. Accordingly, the channel data may be collected by collecting, from the IGMP packets, channel identifier information formed of a specific group address or a pair of a specific source address and a group address. At this point, the control unit 308 matches the channel data collected by the channel data collecting unit 302 and viewing entity information received by the receiving unit 300 to store the matched result in the storage unit 304. However, the above-described channel data collecting method is an exemplary method and various other methods are also available.

On the other hand, according to another embodiment, the channel data collecting unit 302 may collect the channel data through voice data output from the surveying target equipment. To this end, a microphone receiving peripheral sounds as an input may be further provided.

The storage unit 304 stores data (such as an OS, operation program, and setting information) necessary for operation of the audience rating survey apparatus 106. In addition, the storage unit 304 stores the information for viewing entity received from the display device for audience rating survey 102 matched with a preset number. The preset number is stored so as to be matched with a number stored in the storage unit 204 of the display device for audience rating survey 102. In addition, the storage unit 304 stores the channel data matched with the information for viewing entity which has been received and stored in real time when the channel data has been collected by the channel data collecting unit 302.

The transmitting unit 306 periodically transmits a transmission request for the information for viewing entity to the display device for audience rating survey 102. However, if it is set that the information for viewing entity is transmitted periodically in a pre-determined period without a separate transmission request from the display device for audience rating survey 102, the transmitting unit 306 does not periodically transmit the transmission request for the information for viewing entity to the display device for audience rating survey 102. In addition, the transmitting unit 306 transmits, to the audience rating survey server 108, the information for viewing entity received in real time when the channel data, which is matched and stored in the storage unit 304, is collected and the channel data collected by the channel data collecting unit 302 periodically in a preset period or when there is a transmission request from the audience rating survey server 108.

If receiving the information for viewing entity from the display device for audience rating survey 102 periodically in the pre-determined period or when the transmission request is transmitted, the control unit 308 allows the corresponding information for viewing entity to be stored in the storage unit 304. In addition, if detecting that the surveying target equipment 100 is in ON state by receiving the information for viewing entity from the display device for audience rating survey 102, the control unit 308 allows the channel data collecting unit 302 to collect the channel data. At this point, the control unit 308 matches the channel data collected by the channel data collecting unit 302 and the corresponding information for viewing entity which has been received and stored in real time when the channel data has been collected, and stores the matched result in the storage unit 304. In addition, the control unit 308 allows the transmitting unit 306 to transmit, to the audience rating survey server 108, the channel data and the information for viewing entity matched and stored in the storage unit 302 periodically in a pre-determined period or when there is the transmission request from the audience rating survey server 108.

Figure 4:
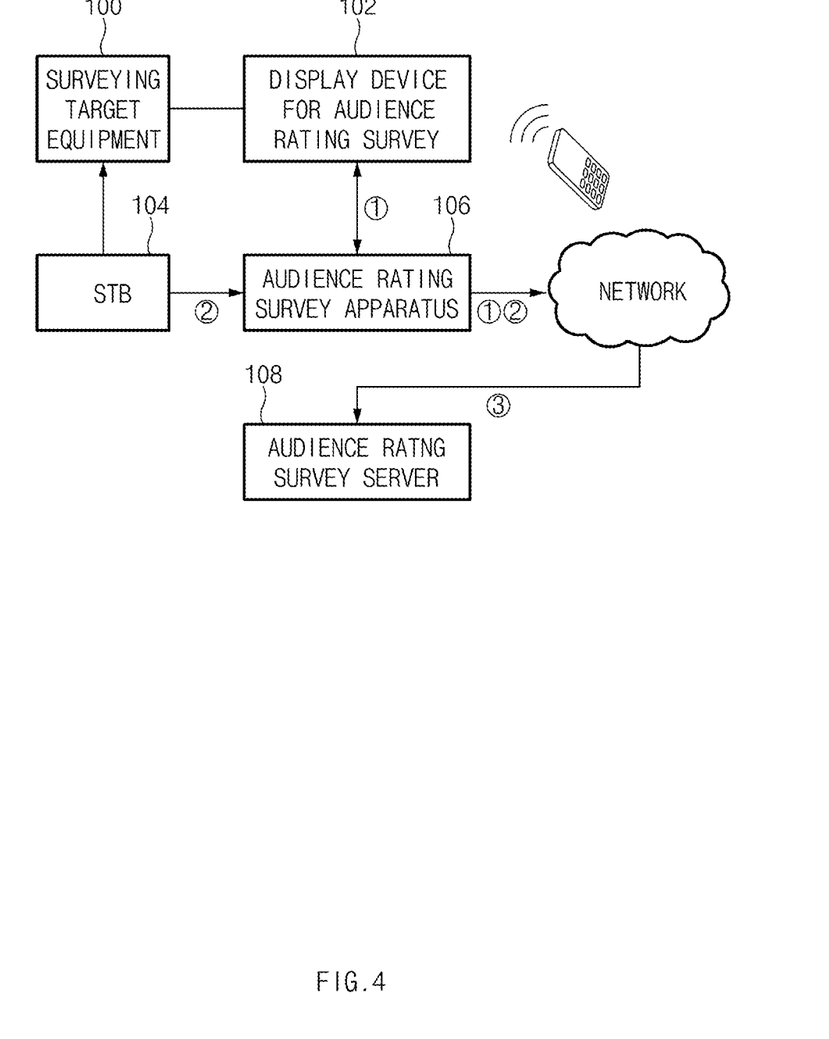
FIG. 4 illustrates an audience rating data collection path in a case where the audience rating survey apparatus 106 is separated from a set-top box.

FIG. 4 illustrates an audience rating data collection path in a case where the audience rating survey apparatus 106 is separated from the STB.

When the display device for audience rating survey 102 is in ON state by receiving power from the surveying target equipment, the audience rating survey apparatus 106 receives information for viewing entity from the display device for audience rating survey 102 periodically in a preset period or in a case where the audience rating survey apparatus 106 requests for transmitting the information for viewing entity ①. In addition, if receiving the information for viewing entity from the display device for audience rating survey 102, the audience rating survey apparatus 106 may know that the surveying target equipment 100, the power supply unit of which is synchronized with the display device for audience rating survey 102, is in ON state. When the surveying target equipment 100 is in ON state, the audience rating survey apparatus 106 allows the channel data collecting unit 302 to collect data ② for a channel which is transmitted from the STB to the internet network and is being viewed by the viewing entity. The audience rating survey apparatus 106 matches the received information for viewing entity ① and the collected viewing channel data ② and stored the matched result in the storage unit 304, and transmits the matched and stored result ①+② to the audience rating survey server 108. The audience rating survey apparatus 106 transmits the matched and stored result ①+② periodically in a preset period or when there is a transmission request from the audience rating survey server 108.

Figure 5:
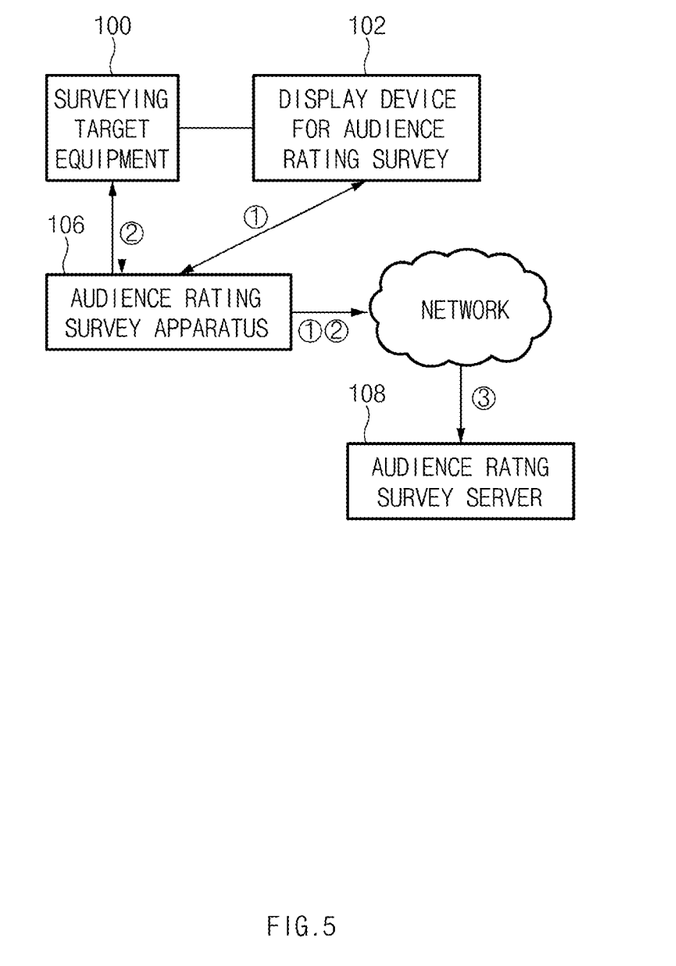
FIG. 5 illustrates an audience rating data collection path in a case where the audience rating survey apparatus 106 is not separated from the set-top box.

FIG. 5 illustrates an audience rating data collection path in a case where the audience rating survey apparatus 106 is not separated from the STB.

When the display device for audience rating survey 102 is in ON state by receiving power from the surveying target equipment, the audience rating survey apparatus 106 receives information for viewing entity ① from the display device for audience rating survey 102 periodically in a preset period or in a case where the audience rating survey apparatus 106 requests for transmitting the information for viewing entity. In addition, if receiving the information for viewing entity from the display device for audience rating survey 102, the audience rating survey apparatus 106 may know that the surveying target equipment 100, the power supply unit of which is synchronized with the display device for audience rating survey 102, is in ON state. When the surveying target equipment 100 is in ON state, the audience rating survey apparatus 106 allows the channel data collecting unit 302 to collect data ② for a channel which is transmitted to the internet network and is being viewed by the viewing entity. The audience rating survey apparatus 106 matches the received information for viewing entity ① and the collected viewing channel data ② and stored the matched result in the storage unit 304, and transmits the matched and stored result ①+② to the audience rating survey server 108. The audience rating survey apparatus 106 transmits the matched and stored result ①+② periodically in a preset period or when there is a transmission request from the audience rating survey server 108.

Figure 6:
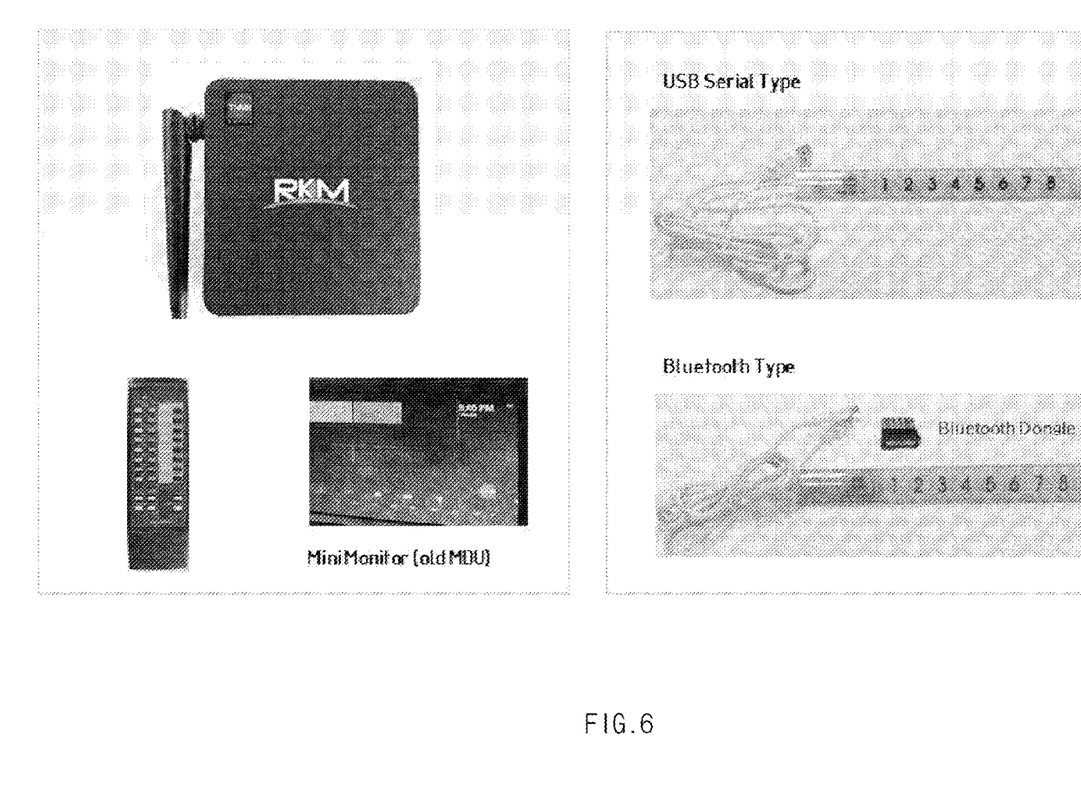
FIG. 6 illustrates exemplary configurations of the audience rating survey apparatus 106 and the display device for audience rating survey 102 in a case where the audience rating survey apparatus 106 is separated from the set-top box.

FIG. 6 illustrates exemplary configurations of the audience rating survey apparatus 106 and the display device for audience rating survey 102 in a case where the audience rating survey apparatus 106 is separated from the STB.

The left components of FIG. 6 show an example of the audience rating survey apparatus 106 and an external device, and the audience rating survey apparatus 106 is, for example, a Mini PC meter. In this case, the audience rating survey apparatus 106 is separated from the STB, and receives information (i.e. data) for viewing entity from the display device for audience rating survey 102 and collects channel data using voice data output from the surveying target equipment.

The right component of FIG. 6 shows an example of the display device for audience rating survey 102. A USB port, which is connectable to a surveying target equipment, is attached to one side of the display device for audience rating survey. In addition, since a number is attached to each light emitting element of the shown display device for audience rating survey 102, in a case where information for viewing entity corresponding to a specific number is received from an external device, a light emitting element corresponding to the specific number emits light. On the other hand, the display device for audience rating survey 102 may be connected to the audience rating survey apparatus 106 through USB or Bluetooth.

Figure 7:
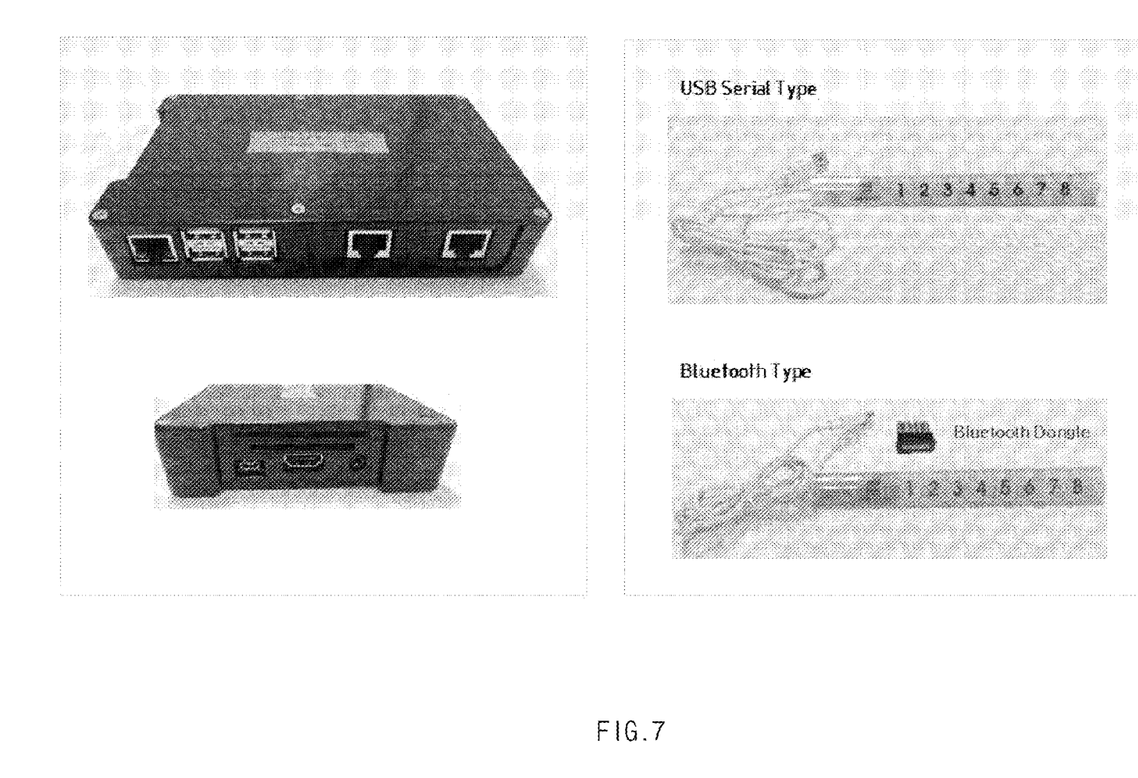
FIG. 7 illustrates exemplary configurations of the audience rating survey apparatus 106 and the display device for audience rating survey 102 in a case where the audience rating survey apparatus 106 is not separated from the set-top box.

FIG. 7 illustrates exemplary configurations of the audience rating survey apparatus 106 and the display device for audience rating survey 102.

The left component of FIG. 7 shows an example of the audience rating survey apparatus 106 and the audience rating survey apparatus 106 is, for example, an IPTV meter. In this case, the audience rating survey apparatus 106 receives information for viewing entity from the display device for audience rating survey 102 and collects data for a channel transmitted to the internet network.

The right component of FIG. 7 shows an example of the display device for audience rating survey 102. A USB connector, which is connectable to a surveying target equipment, is attached to one side of the display device for audience rating survey. In addition, since a number is attached to each light emitting element of the shown display device for audience rating survey 102, in a case where information for viewing entity corresponding to a specific number is received from an external device, a light emitting element corresponding to the specific number emits light. On the other hand, the display device for audience rating survey 102 may be connected to the audience rating survey apparatus 106 through USB or Bluetooth.

Figure 8:
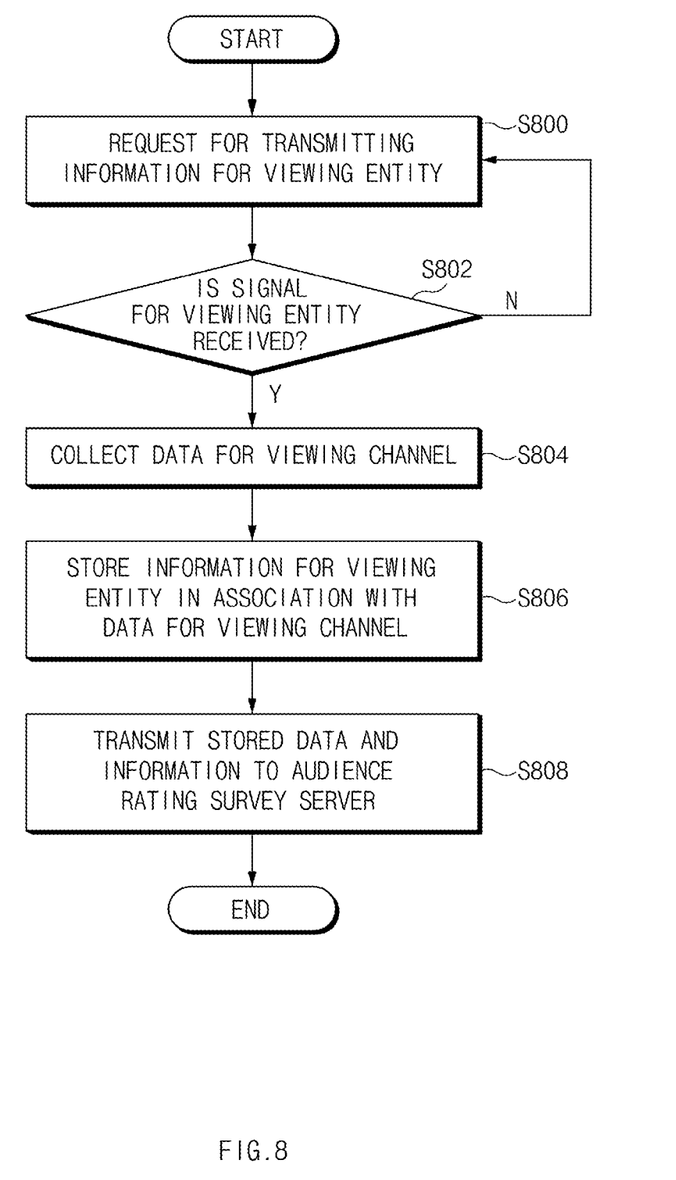
FIG. 8 briefly illustrates a flowchart of an audience rating survey method in the audience rating survey apparatus 106.

FIG. 8 briefly illustrates a flowchart of an audience rating survey method in the audience rating survey apparatus 106.

The audience rating survey apparatus 106 transmits a request for transmitting information for viewing entity in a pre-determined time interval to the display device for audience rating survey 102 (operation S800). However, operation S800 may be omitted in a case where transmission of the information for viewing entity from the display device for audience rating survey 102 is set to be periodically performed at a pre-determined time interval without a separate transmission request by the audience rating survey apparatus 106.

In response to the transmission request for the information for viewing entity from the audience rating survey apparatus 106, if the information for viewing entity is not received from the display device for audience rating survey 102 (operation S802, N), the transmission request for the information for viewing entity is transmitted again at the pre-determined time interval (operation S800). In addition, in response to the transmission request for the information for viewing entity from the audience rating survey apparatus 106, if the information for viewing entity is received from the display device for audience rating survey 102 (operation S802, Y), the audience rating survey apparatus 106 detects the surveying target equipment in ON state and allows the channel data collecting unit 302 to collect channel data transmitted to the internet network (operation S804).

Then, the audience rating survey apparatus 106 matches the collected channel data and corresponding viewing entity information which has been received and stored in real time when the channel data has been collected, and stores the matched result in the storage unit 304 (operation S806). In addition, the audience rating survey apparatus 106 transmits the stored channel data matched with the viewing entity information in a preset certain time interval or when there is a transmission request for audience rating data from the audience rating survey server 108 (operation S808).

Figure 9:
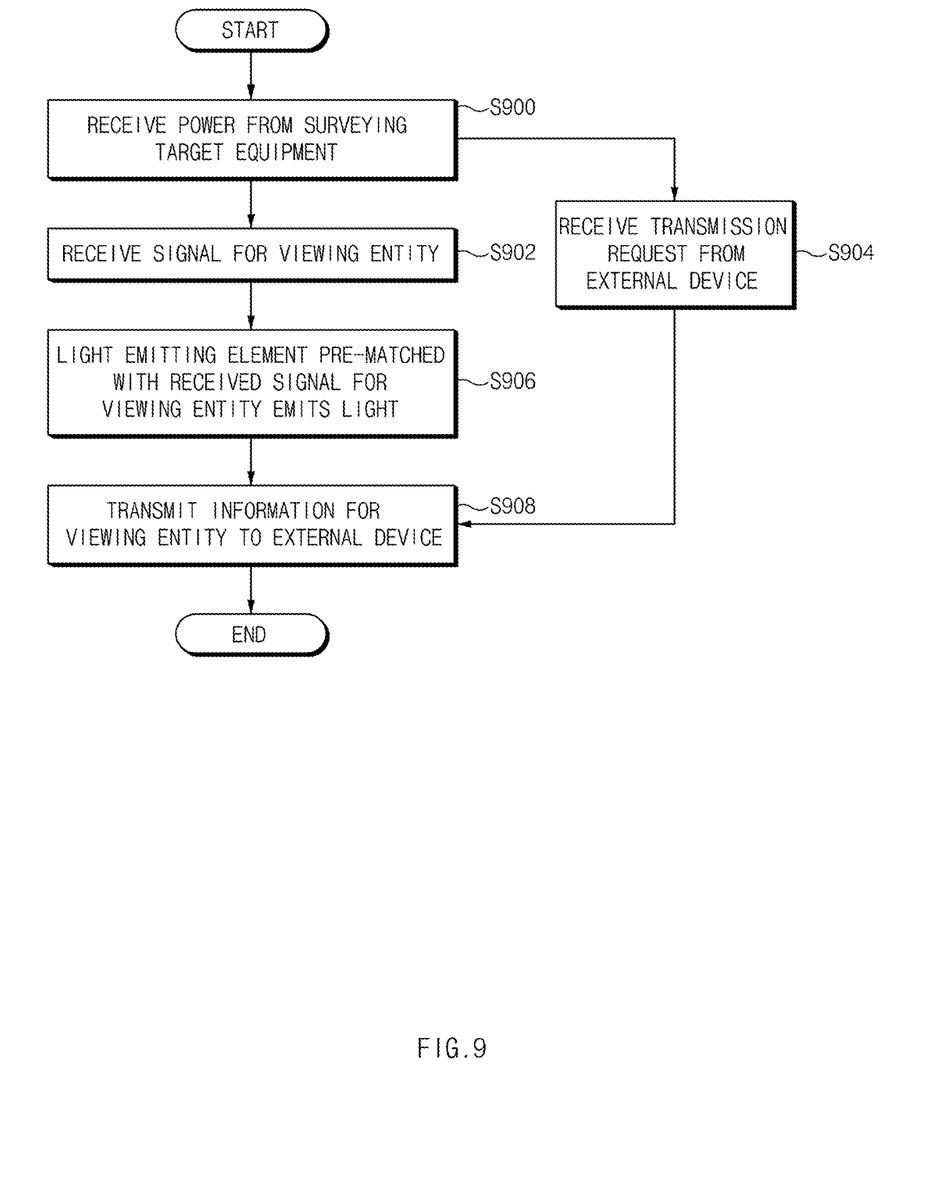
FIG. 9 briefly illustrates a flowchart of an audience rating survey method in the display device for audience rating survey 102.

FIG. 9 briefly illustrates a flowchart of an audience rating survey method in the display device for audience rating survey 102.

Since the power supply unit of the display device for audience rating survey 102 is synchronized with the power supply unit of the surveying target equipment 100, the display device for audience rating survey 102 becomes ON state only when the surveying target equipment is in ON state. In other words, the display device for audience rating survey 102 becomes ON state by receiving power from the surveying target equipment 100 (operation S900). If the display device for audience rating survey 102 becomes ON state and receives the viewing entity information from an external device (operation S902), a light emitting element of a number matched in advance with the received information for viewing entity emits light (operation S906). In addition, the display device for audience rating survey 102 in ON state receives the request for transmitting the viewing entity information from the audience rating survey apparatus (operation S904). However, this operation may be omitted according to the above-described cases. Then, the display device for audience rating survey 102 transmits the information for viewing entity to the audience rating survey apparatus (operation S908).

According to the present disclosure, an apparatus and system may be provided which is capable of surveying audience ratings in real-time with a simpler device.

In addition, an apparatus or system according to various embodiments may include at least one of the above-described components, omit some of the components, or may further include additional other components. The embodiments in the present disclosure are presented for explanation and understanding of the above-disclosed technical content and are not intended to limit the scope of the present disclosure. Accordingly, the scope of the present disclosure should be construed to include all modifications and various other embodiments based on the technical idea of the present disclosure.

What is claimed is:

1. A display device for an audience rating survey system, the display device comprising:
   a power supply unit connected to a surveyed broadcast device so as to receive power only when the surveyed broadcast device is ON state;
   a receiving unit configured to receive a respective identification signal from each of a plurality of different viewing entities;
   a light emitting unit comprising a plurality of light emitting elements, each of the light emitting elements emitting light in response to the receiving unit receiving one of the identification signals assigned to one of the viewing entities;
   a storage unit that stores viewing data, for each of the different viewing entities, indicative of when the light emitting element associated with the respective viewing entity is emitting light;
   a control unit that generates the viewing data and stores the viewing data in the storage unit; and
   a transmitting unit that transmits the viewing data to an external device.

2. The display device of claim 1, wherein the power supply unit becomes ON state if the surveyed broadcast device becomes ON state, and becomes OFF state if the surveyed broadcast device becomes OFF state.

3. The display device of claim 1, wherein the transmitting unit transmits the viewing data to the external device in response to the receiving unit receiving a signal from the external device.

4. The display device of claim 1, wherein the viewing data is wirelessly transmitted by the transmitting unit to the external device.

5. The display device of claim 4, wherein the viewing data is transmitted by the transmitting unit to the external device via a Bluetooth protocol.

6. An audience rating survey system comprising:
a display device for an audience rating survey system, the display device being ON state when a surveyed broadcast device is ON state and OFF state when the surveyed broadcast device is OFF state, the display device comprising a plurality of light emitting elements, each of the light emitting elements emitting light in response to the display device receiving an identification signal from a corresponding viewing entity of a plurality of different viewing entities;
an audience rating survey apparatus that receives viewing data from the display device, generates viewed channel data for the surveyed broadcast device, and transmits the viewing data Preand the viewed channel data to an audience rating survey server that combines the viewing data and the viewed channel data with corresponding data from a plurality of other audience rating survey apparatus to generate audience ratings; and
the audience rating survey server.

7. The audience rating survey system of claim 6, wherein the audience rating survey apparatus generates the viewed channel data based on voice data output from the surveyed broadcast device.

8. The audience rating survey system of claim 6, wherein the audience rating survey apparatus generates the viewed channel data by collecting data indicative of viewed channels of the surveyed broad device and comprising broadcast data transmitted to the surveyed broadcast device.

9. An audience rating survey system, comprising:
an audience rating survey apparatus for providing viewing data and viewed channel data to an audience rating survey server, the audience rating survey apparatus comprising:
a receiving unit that receives the viewing data indicative of viewing of a surveyed broadcast device by at least one viewing entity;
a channel data collecting unit that collects data indicative of viewed channels of the surveyed broadcast device and used to generate the viewed channel data for the surveyed broadcast device;
a storage unit in which the viewing data and the viewed channel data is stored;
a transmitting unit that transmits the viewing data and the viewed channel data over the internet to the audience rating survey server that combines the viewing data and the viewed channel data with corresponding data from a plurality of other audience rating survey apparatus to generate audience ratings; and
a control unit operatively coupled with the receiving unit, the channel data collecting unit, the storage unit, and the transmitting unit; and
a display device that transmits the viewing data to the audience rating survey apparatus, the display device being ON state when the surveyed broadcast device is ON state and OFF state when the surveyed broadcast device is OFF state, and the control unit detects ON state of the surveyed broadcast device by receiving a response to the request from the display device, the display device comprising:
a display device receiving unit configured to receive a respective identification signal from each of a plurality of different viewing entities;
a light emitting unit comprising a plurality of light emitting elements, each of the light emitting elements emitting light in response to the receiving unit receiving one of the identification signals assigned to one of the viewing entities;
a display device storage unit that stores viewing data, for each of the different viewing entities, indicative of when the light emitting element associated with the respective viewing entity is emitting light;
a display device control unit that generates the viewing data and stores the viewing data in the storage unit; and
a display device transmitting unit that transmits the viewing data to the audience rating survey apparatus.

10. An audience rating survey system, comprising:
an audience rating survey apparatus for providing viewing data and viewed channel data to an audience rating survey server, the audience rating survey apparatus comprising:
a receiving unit that receives the viewing data indicative of viewing of a surveyed broadcast device by at least one viewing entity;
a channel data collecting unit that collects data indicative of viewed channels of the surveyed broadcast device and used to generate the viewed channel data for the surveyed broadcast device;
a storage unit in which the viewing data and the viewed channel data is stored;
a transmitting unit that transmits the viewing data and the viewed channel data over the internet to the audience rating survey server that combines the viewing data and the viewed channel data with corresponding data from a plurality of other audience rating survey apparatus to generate audience ratings; and
a control unit operatively coupled with the receiving unit, the channel data collecting unit, the storage unit, and the transmitting unit; and
a display device comprising:
a display device receiving unit configured to receive a respective identification signal from each of a plurality of different viewing entities;
a light emitting unit comprising a plurality of light emitting elements, each of the light emitting elements emitting light in response to the receiving unit receiving one of the identification signals assigned to one of the viewing entities;
a display device storage unit that stores viewing data, for each of the different viewing entities, indicative of when the light emitting element associated with the respective viewing entity is emitting light;
a display device control unit that generates the viewing data and stores the viewing data in the storage unit; and
a display device transmitting unit that transmits the viewing data to the audience rating survey apparatus.

* * * * *